United States Patent
Zhang et al.

(10) Patent No.: US 10,726,562 B2
(45) Date of Patent: Jul. 28, 2020

(54) VIDEO TRACKING METHOD AND DEVICE, AND OBJECT RECOGNITION METHOD AND DEVICE

(71) Applicant: Shanghai Xiaoi Robot Technology Co., Ltd., Shanghai (CN)

(72) Inventors: Bo Zhang, Shanghai (CN); Pinpin Zhu, Shanghai (CN)

(73) Assignee: SHANGHAI XIAOI ROBOT TECHNOLOGY CO., LTD., Shanghai (CN)

(*) Notice: Subject to any disclaimer, the term of this patent is extended or adjusted under 35 U.S.C. 154(b) by 132 days.

(21) Appl. No.: 15/909,402

(22) Filed: Mar. 1, 2018

(65) Prior Publication Data
US 2018/0374219 A1   Dec. 27, 2018

(30) Foreign Application Priority Data
Jun. 27, 2017   (CN) .......................... 2017 1 0501422

(51) Int. Cl.
*G06K 9/00*   (2006.01)
*G06K 9/32*   (2006.01)
(Continued)

(52) U.S. Cl.
CPC .......... *G06T 7/246* (2017.01); *G06K 9/00268* (2013.01); *G06K 9/00295* (2013.01);
(Continued)

(58) Field of Classification Search
None
See application file for complete search history.

(56) References Cited

U.S. PATENT DOCUMENTS 7,245,771 B2 * 7/2007 Kaneko ..................... G06K 9/48
                                                375/E7.11
7,426,286 B2 * 9/2008 Kaneko ..................... G06K 9/48
                                                382/103
(Continued)

FOREIGN PATENT DOCUMENTS

CN   101493944 A   7/2009
CN   101527838 A   9/2009
(Continued)

OTHER PUBLICATIONS

First Office Action, The State Intellectual Property Office of People's Republic of China, App. No. or Pub. No. 201710501422.0, Applicant or Patentee: Shanghai Zhizhen Intelligent Network Technology Co., Ltd., Title: Video Tracking Method, Video Tracking Device, Object Recognition Methon and Object Recognition Device, Doc. No. or Title: CN 105574506A, Pub. Date: May 11, 2016.
(Continued)

*Primary Examiner* — Soo Shin
(74) *Attorney, Agent, or Firm* — Flener IP & Business Law; Zareefa B. Flener (57) ABSTRACT

A video tracking method comprises: determining a first tracking target in a video, and performing a video tracking process on the first tracking target based on the video; performing area overlap degree calculation on the first tracking target in a current image and the first tracking target in a past image during the video tracking process, the past image being an image obtained when the first tracking target was tracked last time in the video tracking process; extracting respective feature information of feature points of the first tracking target in the video during the video tracking process on the first tracking target; matching the extracted respective feature information of the feature points of the first tracking target in the current image with the respective feature information of corresponding feature points of the
(Continued)

first tracking target in the past image if a result of the area overlap degree calculation is less than or equal to a preset threshold; and continuing the video tracking process on the first tracking target if the respective feature information of at least a preset number of feature points among the extracted feature points in the current image matches with the feature information of corresponding feature points of the first tracking target in the past image.

20 Claims, 7 Drawing Sheets

(51) Int. Cl.
    *G06K 9/62*       (2006.01)
    *G06T 7/246*     (2017.01)

(52) U.S. Cl.
    CPC ....... *G06K 9/6217* (2013.01); *G06K 9/00228* (2013.01); *G06K 9/6228* (2013.01); *G06K 2009/3291* (2013.01); *G06T 2207/10016* (2013.01); *G06T 2207/30201* (2013.01)

(56) References Cited

U.S. PATENT DOCUMENTS

| | | | | |
|---|---|---|---|---|
| 8,873,798 | B2* | 10/2014 | Tsagkatakis | G06K 9/6215 348/169 |
| 9,002,099 | B2* | 4/2015 | Litvak | G06K 9/00382 382/154 |
| 2009/0324086 | A1* | 12/2009 | Tojo | G06K 9/00295 382/190 |
| 2013/0272570 | A1* | 10/2013 | Sheng | G06F 3/017 382/103 |
| 2015/0310624 | A1* | 10/2015 | Bulan | G06K 9/66 382/103 |
| 2018/0204111 | A1* | 7/2018 | Zadeh | G06N 3/0436 |

FOREIGN PATENT DOCUMENTS

| | | |
|---|---|---|
| CN | 102592147 A | 7/2012 |
| CN | 102750527 A | 10/2012 |
| CN | 104834946 A | 8/2015 |
| CN | 105574506 A | 5/2016 |
| CN | 106097385 A | 11/2016 |

OTHER PUBLICATIONS

The First Office Action, The State Intellectual Property Office of People's Republic of China, Application No. 2017105014220, Submitted Comments.

The State Intellectual Property Office of People's Republic of China, Shanghai Zhizhen Intelligent Network Technology Co., Ltd., Video Tracking Method, Video Tracking Evice, Object Recognition Method and Object Recognition Device, The Second Office Action, Publication Date: Apr. 15, 2016.

The State Intellectual Property Office of People's Republic of China, The Second Office Action, Application No. 2017105014220, Examiner Code: 861390.

Publisher: China Academic Journal (CD-ROM) Electronic Publishing House, Title of the Item: Chinese Master's Theses Full-text Database, Information Science and Technology, Volume-issue Number: 2016 vol. 4, Author: Xiaolin Zhang, Title: Design and Implementation of Video Analysis System Based on TLD and SIFT, Relevant Pages of the publication: p. 138-1058, Date: Apr. 15, 2016, Place of publication: Huaye Building, Tsinghua University, Beijing, China.

* cited by examiner

VIDEO TRACKING METHOD AND DEVICE, AND OBJECT RECOGNITION METHOD AND DEVICE

CROSS-REFERENCE TO RELATED APPLICATIONS

The present application claims priority to Chinese Patent Application No. 201710501422.0, filed on Jun. 27, 2017, all contents of which are incorporated by reference herein.

TECHNICAL FIELD

Embodiments of the present invention relate to the field of video analysis technology, and more particularly to a video tracking method, a video tracking device, an object recognition method and an object recognition device.

BACKGROUND

Video tracking and recognition technology based on computer vision has been widely used in public security, authentication and other occasions. For instance, suspicious objects can be tracked by continuous video tracking of the suspicious objects in the surveillance video, and the suspicious objects can be further identified through intelligent recognition of the suspicious objects so as to provide powerful clues for the criminal investigation process.

However, it is hard for the existing video tracking method to complete the continuous tracking of the same tracking object, since the sampling frame rate of the surveillance video is not high and the camera may violently move during the sampling process. The existing video tracking method cannot determine whether the current tracking object is the same as the previous tracking object when a breakpoint occurs in the tracking process, and the discontinuity of the tracking process may cause the loss of the tracking object. In addition, the existing object recognition method based on video tracking is also complex, and the recognition efficiency is low.

SUMMARY

Aspects of the present invention are directed toward a video tracking method and device which may improve the accuracy of the video tracking.

Additional aspects of the present invention are directed toward an object recognition method and device, which may speed up the recognition speed, and improve the accuracy and efficiency of the recognition process.

A video tracking method according to the embodiments of the present invention comprises: determining a first tracking target in a video, and performing a video tracking process on the first tracking target based on the video; performing area overlap degree calculation on the first tracking target in a current image and the first tracking target in a past image during the video tracking process, the past image being an image obtained when the first tracking target was tracked last time in the video tracking process; extracting respective feature information of feature points of the first tracking target in the video during the video tracking process on the first tracking target; matching the extracted respective feature information of the feature points of the first tracking target in the current image with the respective feature information of corresponding feature points of the first tracking target in the past image if a result of the area overlap degree calculation is less than or equal to a preset threshold; and continuing the video tracking process on the first tracking target if the respective feature information of at least preset number of feature points among the extracted feature points in the current image matches with respective feature information of corresponding feature points of the first tracking target in the past image.

In an embodiment of the present invention, extracting respective feature information of feature points of the first tracking target in the video comprises: extracting the respective feature information of the feature points of the first tracking target in the current image of the video tracking process if a result of the area overlap degree calculation of the current image of the video tracking process is less than or equal to a preset threshold; or, extracting the respective feature of the feature points of the first tracking target in each frame image of the video tracking process in real time.

In an embodiment of the present invention, extracting respective feature information of feature points of the first tracking target in the video comprises: recognizing the feature points of the first tracking target in the video; and extracting the respective feature information of the recognized feature points.

In an embodiment of the present invention, the video tracking method further comprises: determining the first tracking target is not a first tracking object and creating a second tracking target based on the extracted feature points in the current image, and performing video tracking on the second tracking target based on the video if a number of matched feature points among the extracted feature points in the current image is less than a preset number.

In an embodiment of the present invention, after performing area overlap degree calculation on the first tracking target in a current image and the first tracking target in a past image, the video tracking method further comprises: directly continuing the video tracking process on the first tracking target if a result of the area overlap degree calculation is greater than a preset threshold.

In an embodiment of the present invention, the first tracking target is a human face object, the feature points comprise one or more of the following items: a left eye feature point, a right eye feature point, a nose tip feature point, a left mouth corner feature point and a right mouth corner feature point, and the respective feature information of the feature points comprises one or more of the following items: sift feature information, fast feature information and surf feature information.

An object recognition method according to the embodiments of the present invention comprises the video tracking method, and the object recognition method further comprises: extracting object recognition feature vectors based on at least one frame image of the video tracking process on the first tracking target; matching the extracted object recognition feature vectors with object feature vectors of registered objects in a registration object library, the registration object library being established based on pre-learning of the object feature vectors in images of a plurality of registered objects; and taking the one registered object as a recognition result if the extracted object recognition feature vectors match with the object feature vectors of one registered object.

In an embodiment of the present invention, before matching the extracted object recognition feature vectors with object feature vectors of registered objects in a registration object library, the object recognition method further comprises: extracting attribute information based on at least one frame image of the video tracking process on the first tracking target; filtering out registered objects corresponding to the extracted attribute information in the registration object library, the registration object library being established based on pre-learning of the object feature vectors and attribute information in images of a plurality of registered objects; wherein matching the extracted object recognition feature vectors with object feature vectors of registered objects in a registration object library comprises: matching the extracted object recognition feature vectors with respective object feature vectors of the filtered registered objects.

In an embodiment of the present invention, the first tracking target is a human face object, and the attribute information comprises one or more of gender information and age information.

In an embodiment of the present invention, the at least one frame image used for extracting the object recognition feature vectors is picked from a photo stream formed by performing the video tracking process on the first tracking target, picking conditions comprising one or more of the following items: a degree of blurring, a degree of exposure and object posture.

In an embodiment of the present invention, after extracting respective feature information of feature points of the first tracking target in the video, the object recognition method further comprises: aligning the images of the video with a preset image template based on position of the extracted feature points in images of the video; wherein the at least one frame image used for extracting the object recognition feature vectors is picked from the images through the aligning process.

A video tracking device according to the embodiments of the present invention comprises: a tracking target determination module, configured to determine a first tracking target in a video; a tracking execution module, configured to perform a video tracking process on the first tracking target based on the video; an area overlap degree calculation module, configured to perform area overlap degree calculation on the first tracking target in a current image and the first tracking target in a past image during the video tracking process, the past image being an image obtained when the first tracking target was tracked last time in the video tracking process; a first extraction module, configured to extract respective feature information of feature points of the first tracking target in the video tracking process on the first tracking target; and a first matching module, configured to match the extracted respective feature information of the feature points of the first tracking target in the current image and the respective feature information of corresponding feature points of the first tracking target in the past image if a result of the area overlap degree calculation is less than or equal to a preset threshold; wherein the tracking execution module is further configured to continue the video tracking process on the first tracking target if the respective feature information of at least preset number of feature points among the extracted feature points in the current image matches with respective feature information of corresponding feature points of the first tracking target in the past image.

In an embodiment of the present invention, the first extraction module is further configured to: extract the respective feature information of the feature points of the first tracking target in the current image of the video tracking process if a result of the area overlap degree calculation of the current image of the video tracking process is less than or equal to a preset threshold; or, extract the respective feature of the feature points of the first tracking target in each frame image of the video tracking process in real time.

In an embodiment of the present invention, the first extraction module comprises: a recognizing program unit, configured to recognize the feature points of the first tracking target in the video; and an extracting program unit, configured to extract the respective feature information of the recognized feature points.

In an embodiment of the present invention, the video tracking device further comprises: a judging module, configured to determine the first tracking target is not a first tracking object if a number of matched feature points among the extracted feature points in the current image is less than a preset number; the tracking target determination module is further configured to: create a second tracking target based on the extracted feature points in the current image if a number of matched feature points among the extracted feature points in the current image is less than a preset number; wherein the tracking execution module is further configured to perform video tracking on the second tracking target based on the video.

In an embodiment of the present invention, the tracking execution module is further configured to: directly continue the video tracking process on the first tracking target if a result of the area overlap degree calculation is greater than a preset threshold.

An object recognition device according to embodiments of the present invention comprises the video tracking device, the object recognition device further comprises: a second extraction module, configured to extract object recognition feature vectors based on at least one frame image of the video tracking process on the first tracking target; a second matching module, configured to match the extracted object recognition feature vectors with object feature vectors of registered objects in a registration object library, the registration object library being established based on pre-learning of the object feature vectors in images of a plurality of registered objects; and a recognition execution module, configured to take the one registered object as a recognition result if the extracted object recognition feature vectors match with the object feature vectors of one registered object.

In an embodiment of the present invention, the second extraction module is further configured to extract attribute information based on the at least one frame image of the video tracking process on the first tracking target before matching the extracted object recognition feature vectors with the object feature vectors of the registered objects in the registration object library; wherein the object recognition device further comprises: a filtering module, configured to filter out registered objects corresponding to the extracted attribute information in the registration object library, the registration object library being established based on pre-learning of the feature vectors and attribute information in images of a plurality of registered objects; wherein the second matching module is further configured to match the extracted object recognition feature vectors with the respective object feature vectors of the filtered registered objects filtered by the filtering module.

In an embodiment of the present invention, the object recognition device further comprises: a picking module, configured to pick out the at least one frame image used for extracting the object recognition feature vectors from a photo stream formed by performing the video tracking process on the first tracking target, picking conditions comprising one or more of the following items: a degree of blurring, a degree of exposure and object posture.

In an embodiment of the present invention, the object recognition device further comprises: an aligning module, configured to align images of the video with a preset image template based on position of the extracted feature points in the images of the video after the respective feature information of the feature points of the first tracking target in the video is extracted; wherein the picking module is further configured to pick out the at least one frame image used for extracting the object recognition feature vectors from the images through the aligning process by the aligning module.

The video tracking method and device according to the embodiments of the present invention may keep the video tracking process on the first tracking target efficiently by performing area overlap degree calculation on the first tracking target in the current image and the first tracking target in the past image of the video, and further matching the feature information of the feature points of the first tracking target between the current image and the past image. Thus, even if the sampling frame rate of the monitoring video is low or the area overlap degree is low due to the violent motion during the sampling process, whether the first tracking target in the current image and the first tracking target in the past image are the same tracking object may still be determined through the feature information comparison; and the video tracking process on the first tracking target is continued if the number of the matched feature points among the extracted feature points is greater than a preset number, so that a continuous video tracking on the first tracking object can be accurately carried out under some undesirable conditions such as low sampling frame rate and violent motion.

The object recognition method and device according to embodiments of the present invention may reduce the object retrieval rang in the recognition process, speed up the recognition speed, and improve the accuracy and efficiency of the recognition process by establishing the registration object library based on the feature vectors, and matching the feature vectors between the first tracking target in the video tracking process and the registered objects in the registration object library.

BRIEF DESCRIPTION OF DRAWINGS

FIG. 1' is a flowchart illustrating a video tracking method according to another embodiment of the present invention.

DETAILED DESCRIPTION

In the following detailed description, embodiments will be described with reference to the accompanying drawings. However, the present invention may be embodied in various different forms, and should not be construed as being limited only to the illustrated embodiments. Rather, these embodiments are provided as examples, simply by way of illustrating the concept of the present invention to those skilled in the art. Accordingly, processes, elements, and techniques that should be apparent to those of ordinary skill in the art are not described herein.

Figure 1:
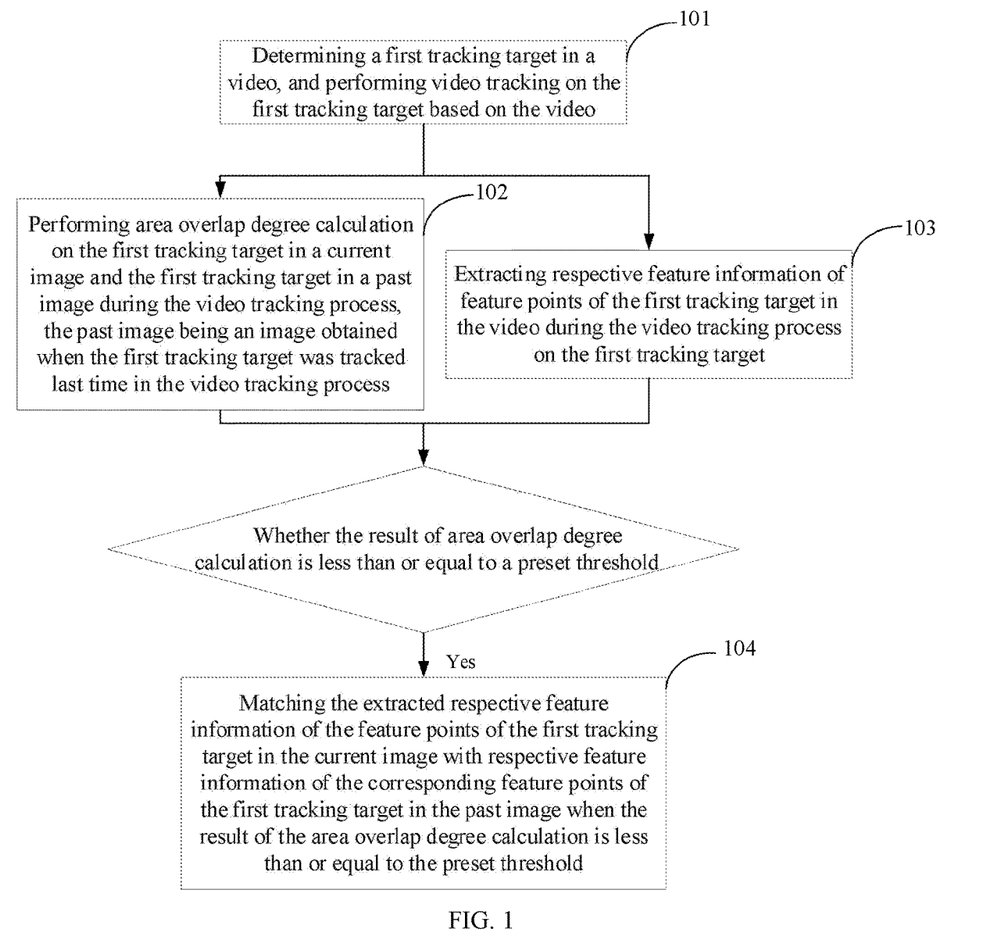
FIG. 1 is a flowchart illustrating a video tracking method according to an embodiment of the present invention.

FIG. 1 is a flowchart illustrating a video tracking method according to an embodiment of the present invention. As shown in FIG. 1, the method includes the following steps:

Step 101: determining a first tracking target in a video, and performing video tracking on the first tracking target based on the video.

Specifically, the first tracking target may be detected from the video based on preset tracking object features. For instance, if the first tracking target is a specific human face object, the specific human face object may be detected from the video based on some facial features of the specific human face. However, it may be understood that the specific format of the first tracking target is determined by the monitoring staff according to the actual monitoring requirement, and the ways of determining the first tracking target in the video may also be different depending on the different specific formats of the first tracking target. The specific format of the first tracking target and the specific way of determining the first tracking target from the video are not limited in the present invention.

Step 102: performing area overlap degree calculation on the first tracking target in a current image and the first tracking target in a past image during the video tracking process, the past image being an image obtained when the first tracking target was tracked last time in the video tracking process.

Area overlap degree calculation is a calculation method of measuring the overlap degree of two video objects in area, and the result of the area overlap degree calculation is an overlap ratio of the two objects in area. Thus, whether the first tracking target in the current image and the first tracking target in the past image are the same object may be preliminary determined through the area overlap degree calculation process. When the result of the area overlap degree calculation is greater than a preset threshold, it may be preliminary determined that the first tracking target in the current image and the first tracking target in the past image are the same object; in contrast, when the result of the area overlap degree calculation is less than or equal to the preset threshold, it may be preliminary determined that the first tracking target in the current image is likely to be not the same object as the first tracking target in the past image. When the first tracking target in the current image and the first tracking target in the past image are the same object, both of them may be considered as the first tracking object that the monitoring staff need to track.

It may be understood that, as a criterion of the area overlap degree calculation and the subsequent feature information matching, the past image may be selected from the images which are obtained when the first tracking target was tracked last time in the video tracking process. For instance, in an embodiment of the present invention, if the current image is a real-time extracted image and the tracking on the first tracking target is maintained, the past image may be a previous frame image of the current image in which the first tracking object is detected. Since the extracting process of the current image is performed in real time, the area overlap degree calculation process using the past image is also performed in real time, so as to keep the continuous tracking on the first tracking target. However, the specific selection principle of the past image is not limited in the present invention, and an image may be selected as a past image as long as it is obtained when the first tracking target was tracked last time.

Step 103: extracting respective feature information of feature points of the first tracking target in the video during the video tracking process on the first tracking target.

Specifically, the feature points of the first tracking target in the video may be recognized first, and then the respective feature information of the recognized feature points may be further extracted. As mentioned, it may be understood that the specific format of the first video tracking object may be determined by the monitoring staff according to actual monitoring requirement, the corresponding feature points and feature information may also be adjusted according to the specific format of the first video tracking object. Still taking a human face as an example of the first video tracking object, the feature points of the human face object may include one or more of the following items: a left eye feature point, a right eye feature point, a nose tip feature point, a left mouth corner feature point and a right mouth corner feature point. The feature information corresponding to the feature points may include one or more of the following items: sift feature information, fast feature information and surf feature information. However, the specific formats of the feature points and the feature information corresponding to the first video tracking object are not limited in the present invention.

In an embodiment of the present invention, the extracted image may be a current image extracted in real time, which means the feature information of the feature points of the first tracking target in each frame image of the video tracking process is extracted in real time. In this way, the first tracking target in each frame image needs to go through a matching process with the past image, so as to ensure the real-time performance and accuracy of the video tracking process.

Step 104: matching the extracted respective feature information of the feature points of the first tracking target in the current image with respective feature information of the corresponding feature points of the first tracking target in the past image if the result of the area overlap degree calculation is less than or equal to the preset threshold.

Specifically, whether the first tracking target in the current image and the first tracking target in the past image are the same object may be further determined by combining the above matching process based on the feature information of the feature points, even if the result of the area overlap degree calculation is less than or equal to the preset threshold, so as to further eliminate the effect of the sampling frame rate and the stability of the sampling process on the area overlap degree calculation result, and further improve the accuracy of the tracking process.

FIG. 1' is a flowchart illustrating a video tracking method according to another embodiment of the present invention. Compared with the video tracking method shown in FIG. 1, the video tracking method shown in FIG. 1' further includes Steps 105~108.

Specifically, as shown in FIG. 1', the video tracking process on the first tracking target may be directly continued (Step 108) if the result of the area overlap degree calculation is greater than the preset threshold, so as to improve the efficiency of the video tracking process. For instance, when the sampling frame rate of the video is high enough, and the first tracking target in the current image and the first tracking target in the past image have been determined to be the same object by the area overlap degree calculation, it can be confirmed that the tracking object is not changed. In this case, the tracking process on the first tracking object may be directly continued.

It may be understood that the continuous video tracking process described herein may actually be a process of forming a continuous video tracking code stream for the first tracking target. For example, when a breakpoint has occurred in the video tracking process, a subsequent video code stream for the first tracking object may be spliced with a previous video code stream for the first tracking object.

In an embodiment of the present invention, further determination in combination with the matching process based on the feature information of the feature points described above is required only when the result of the area overlap degree calculation determines that the first tracking target in the current image and the first tracking target in the past image are likely not to be the same object. Based on this, the feature information of the feature points of the first tracking target in the current image may be extracted only when the result of the area overlap degree calculation of the current image is less than or equal to the preset threshold, which may further reduce the feature information extraction burden of the subsequent matching process and further improve the efficiency, although the feature information of feature points of the first tracking target in each frame image is extracted in real time and used for the matching process may ensure the real-time performance and accuracy of the tracking process. That is, only for the image whose area overlap degree calculation result is less than or equal to the preset threshold, the feature information of the feature points is extracted to further determine whether the first tracking target in the current image and the first tracking target in the past image are the same object.

Step 105: continuing the video tracking process on the first tracking object if the respective feature information of at least a preset number of the feature points among the extracted feature points in the current image matches with the feature information of the corresponding feature points of the first tracking target in the past image.

Specifically, the first tracking target in the current image and the first tracking target in the past image may be determined to be the same object if the number of the matched feature points among the extracted feature points in the current image is greater than or equal to a preset number. That is, the first tracking target in the current image and the first tracking target in the past image are both the first tracking object that the monitoring staff needs to track, and the video tracking process on the first tracking target may be continued.

It may be determined that the first tracking target may not be the first tracking object if the number of the matched feature points among the extracted feature points in the current image is less than the preset number. At this moment, the video tracking process on the first tracking target may be ended (Step 106); a second tracking target is created based on the extracted feature points in the current image, and the video tracking on the second tracking target is performed based on the video (Step 107). Therefore, the video tracking process on the second tracking target is started, and then Steps 101~107 may be implemented so as to keep the video tracking process on the second tracking target, and repeated description is omitted to avoid redundancy here.

It can be seen from the above that the video tracking method according to the embodiments of the present invention may keep the video tracking process on the first tracking target efficiently by performing area overlap degree calculation on the first tracking target in the current image and the first tracking target in the past image of the video, and further matching the feature information of the feature points of the first tracking target between the current image and the past image. Thus, even if the sampling frame rate of the monitoring video is low or the area overlap degree is low due to the violent motion during the sampling process, whether the first tracking target in the current image and the first tracking target in the past image are the same tracking object may still be determined through the feature information comparison; and the video tracking process on the first tracking target is continued if the number of the matched feature points among the extracted feature points is greater than a preset number, so that a continuous video tracking on the first tracking object can be accurately carried out under some undesirable conditions such as low sampling frame rate and violent motion.

Figure 2:
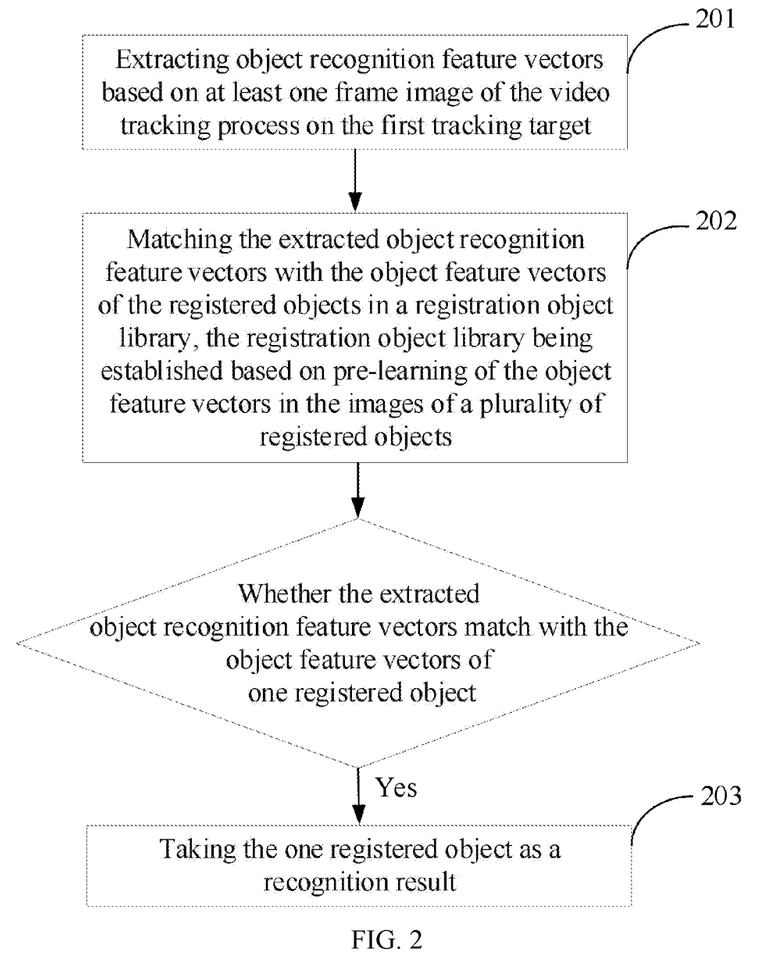
FIG. 2 is a flowchart illustrating an object recognition method according to an embodiment of the present invention.

FIG. 2 is a flowchart illustrating an object recognition method according to an embodiment of the present invention. The object recognition method includes the video tracking method described in any of the previous embodiments. As shown in FIG. 2, the object recognition method further includes the following steps:

Step 201: extracting object recognition feature vectors based on at least one frame image of the video tracking process on the first tracking target.

Although the at least one frame image of the video tracking process includes the first tracking target, but the specific presentation format of the first tracking target in the at least one frame image may be different. That is, the values in different eigenvectors are different in the vector space formed by all the features of the first tracking target. The first tracking target may be characterized by using the object recognition feature vectors which are extracted from the at least one frame image of the video tracking process on the first tracking target, so as to perform matching with the object feature vectors of the registered objects in the subsequent matching process. The extraction process of the object recognition feature vectors may be implemented based on an extraction model generated by deep learning.

It may be understood that the more images are selected, the better characterization effect for the first tracking target will be acquired, which helps to improve the accuracy of the subsequent matching process, but it also increases the computational burden of the subsequent matching process. Thus, the number of the selected images of the video tracking process may be set according to the actual requirement, which is not limited in the present invention.

In an embodiment of the present invention, the at least one frame image for extracting the object recognition feature vectors may be picked from the photo stream formed by performing video tracking process on the first tracking target, and picking conditions may include one or more of the following items: a degree of blurring, a degree of exposure and object posture. The video tracking image selected by the above picking conditions can ensure the extraction quality of the object recognition feature vectors, help to improve the characterization effect of the object recognition feature vectors on the first tracking target, and improve the accuracy of the subsequent matching process.

In another embodiment of the present invention, in order to further improve the picking quality and efficiency of the selected at least one frame image, the images may be aligned with a preset image template according to position of the extracted feature points in the images after the feature information of the feature points of the first tracking target in the image of the video is extracted every time; then, the at least one frame image used for extracting the object recognition feature vectors may be picked from the images through the aligning process, so as to ensure the picking quality of the at least one frame image. For instance, when the feature information is extracted in real time for each frame image during the video tracking process, each frame image will go through the aligning process with the preset image template. Since the extracting position corresponding to the object recognition feature vectors to be extracted is preset on the preset image template, the object recognition feature vectors extraction process performed on the image after the aligning process can be accurate and efficient.

Step 202: matching the extracted object recognition feature vectors with object feature vectors of registered objects in a registration object library, the registration object library being established based on pre-learning of the object feature vectors in images of a plurality of registered objects.

Specifically, the registration object library may include a plurality of registered objects. Since the registration object library is established based on pre-learning of the object feature vectors in images of a plurality of registered objects, the registration object library is actually equivalent to storing corresponding relationship between the plurality of registered objects and their respective object feature vectors. Therefore, the registered object corresponding to the extracted object recognition feature vectors may be found by matching the extracted object recognition feature vectors with the object feature vectors in the registration object library.

When the image used for extracting the object recognition feature vectors has multiple frames, one object recognition feature vector may be respectively extracted based on each frame image in the multi-frame image, then the extracted object recognition feature vectors are respectively matched with the object feature vectors of the registered objects in the registration object library. When the image used for extracting the object recognition feature vectors has only one frame, the object recognition feature vectors are extracted based on the one frame image, then the extracted object recognition feature vectors are respectively matched with the object feature vectors of the registered objects in the registration object library.

Step 203: taking the one registered object as a recognition result if the extracted object recognition feature vectors match with the object feature vectors of one registered object.

The matching process based on the feature vectors may be performed by calculating the vector distances between the object recognition feature vectors and the object feature vectors. Specifically, in an embodiment of the present invention, the matching process based on the feature vectors may be performed by extracting an object recognition feature vector $L_n$ (n=1 . . . N) based on N (N≥1) frame images respectively, and then calculating vector distances between N object recognition feature vectors and the object feature vectors $P_m$ (m=1 . . . M) of each of M (M≥2) registered objects in the registration object library respectively. The vector distance may be represented by $D_{nm}$, which means the vector distance between the object recognition feature vector $L_n$ of the nth frame image in the N frame images and the object feature vector $P_m$ of the mth registered object in the M registered objects.

In this way, each registered object in the registration object library obtains N vector distances from the N object recognition feature vectors. Since the image quality of each frame image in the N frame images differs, the contribution of each frame image in the N frame images to the matching process may be different. Therefore, each frame image in the N frame image may be assigned a weight factor $S_n$ (n=1 . . . N), and an image with higher image quality may be assigned a higher weight factor. Thus, each registered object in the registration object library may obtain a final matching distance $H_m$ (m=1 . . . M), which is obtained by weighted summation of the N vector distances corresponding to the registered object. For instance, the matching distance of the third registered object may be represented by $H_3 = \Sigma_{n=1 \ldots N} S_n D_{n3}$. Then the shortest matching distance among the respective matching distances $H_m$ (m=1 . . . M) of the M registered objects is obtained.

If the shortest matching distance is less than the preset distance threshold, it is considered that the registered object corresponding to the shortest matching distance matches with the first tracking target, and the registered object corresponding to the shortest matching distance is taken as the recognition result. If the shortest matching distance is greater than the preset distance threshold, it is considered that no matching registered object is found, and it indicates that there is no registered object corresponding to the first tracking target in the registration object library.

In another embodiment of the present invention, the step of comparing the recognition result with the preset distance threshold may also be omitted, and the registered object corresponding to the shortest matching distance is directly output as the matched registered object by default. In this case, the first tracking target may be further recognized by other existing manners, and details are not described to avoid redundancy here.

It may be understood, although the size of the matching distance is used as a judgment means of evaluating the matching result in the above description, specifically, the matching distance is obtained by the way of the vector distances weighted summation, and the weight factor is used as a coefficient of the vector distances weighted summation; the specific manner of judging the matching result is not limited to the manners described above. For instance, in an embodiment of the present invention, the vector distances may also be directly superposed without reference to the weight factor. In another embodiment of the present invention, an average value of the vector distances may also be obtained as a final matching distance. The specific judgment method of the matching result is not strictly limited in the present invention.

The object recognition methods according to the embodiments of the present invention reduce the object retrieval range in the recognition process, speed up the recognition speed, and improve the accuracy and efficiency of the recognition process by establishing the registration object library based on the object feature vectors and matching the feature vectors between the first tracking target in the image of the video tracking and the registered objects in the registration object library.

It may be understood, although only the object recognition process for "the first tracking target" is described in the above embodiments, the concept of "the first tracking target" here is actually relative to the target to be recognized in the current tracking process. For instance, when the video tracking process for "the second tracking target" is started in the video tracking on "the first tracking target" (as described in Step 107), the object recognition process on "the second tracking target" may also be performed by the process of the above Steps 201 to 203. That is, the concept of "the first tracking target" is not intended to limit the protection scope of the object recognition methods according to the embodiments of the present invention.

Figure 3:
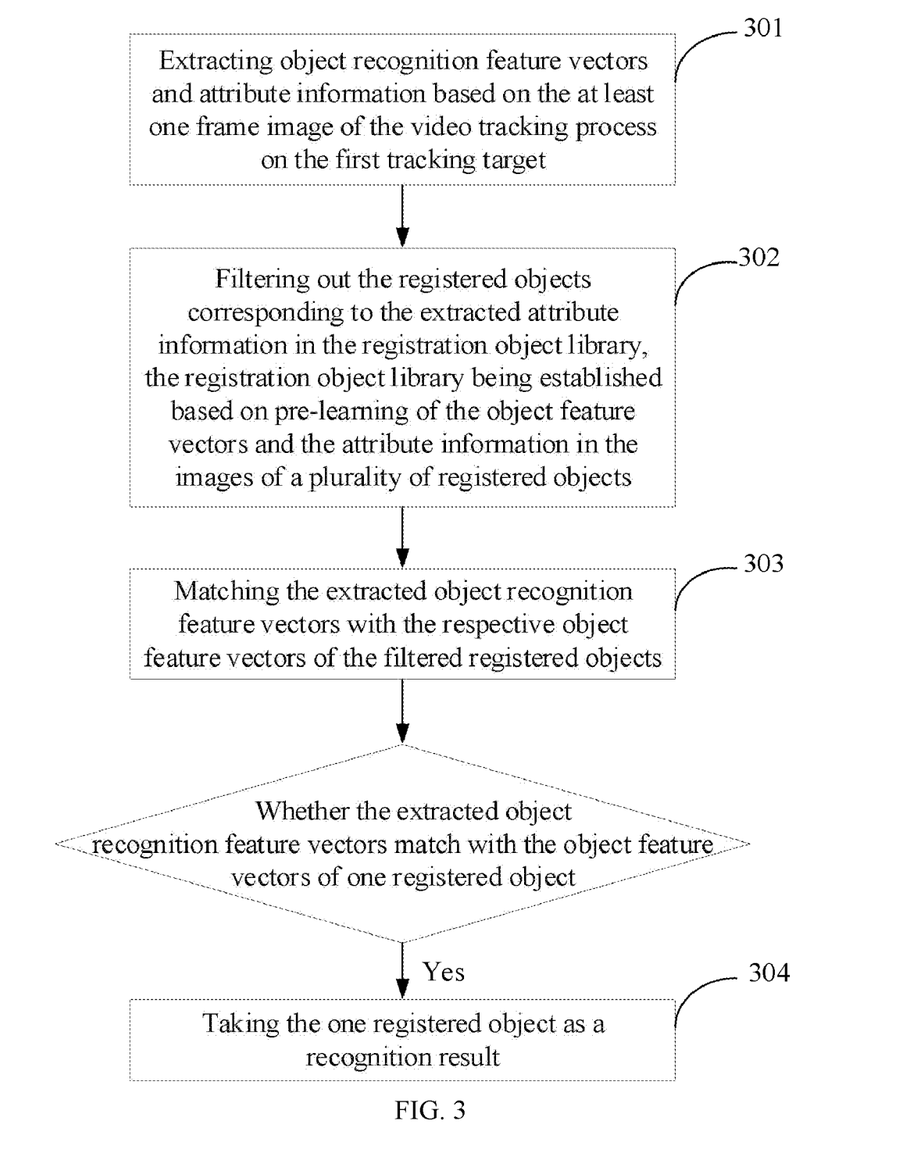
FIG. 3 is a flowchart illustrating an object recognition method according to another embodiment of the present invention.

In an embodiment of the present invention, in order to further reduce the object retrieval range and further improve the accuracy and efficiency of the recognition process, as shown in FIG. 3, the object recognition method may further include the following steps:

Step 301: extracting object recognition feature vectors and attribute information based on the at least one frame image of the video tracking process on the first tracking target.

It may be understood that the attribute information is information used for characterizing the identity of the first tracking target, and the specific content and format of the attribute information may be adjusted according to the specific format of the first tracking target. For instance, when the first tracking target is a human face object, the attribute information may include one or more of gender information and age information. The gender information and the age information may generally be extracted from the first tracking target in the video image through the model based on the deep-learning training.

Step 302: filtering out the registered objects corresponding to the extracted attribute information in the registration object library, the registration object library being established based on pre-learning of the object feature vectors and the attribute information in the images of a plurality of registered objects.

Since the registration object library is established based on pre-learning of the object feature vectors and the attribute information of the registered objects, the registered object library actually stores corresponding relationship between the registered objects and the attribute information. For instance, when all the registered objects in the registered object library are human face objects, it is equivalent to establishing a face object classification based on attribute information (for instance, gender information or age information). In this case, the registered objects in the registration object library are filtered first based on the extracted attribute information, so that the registered objects corresponding to the extracted attribute information can be filtered out.

Step 303: matching the extracted object recognition feature vectors with the respective object feature vectors of the filtered registered objects.

The filtered registered objects are the registered objects corresponding to the extracted attribute information. Thus, when the matching process based on the feature vectors is further performed on the filtered registered objects, the object retrieval range of the matching process based on the feature vectors may be further reduced, which may further speed up the recognition speed and improve the accuracy and efficiency of the recognition process.

Step 304: taking the one registered object as a recognition result if the extracted object recognition feature vectors match with the object feature vectors of one registered object.

Figure 4:
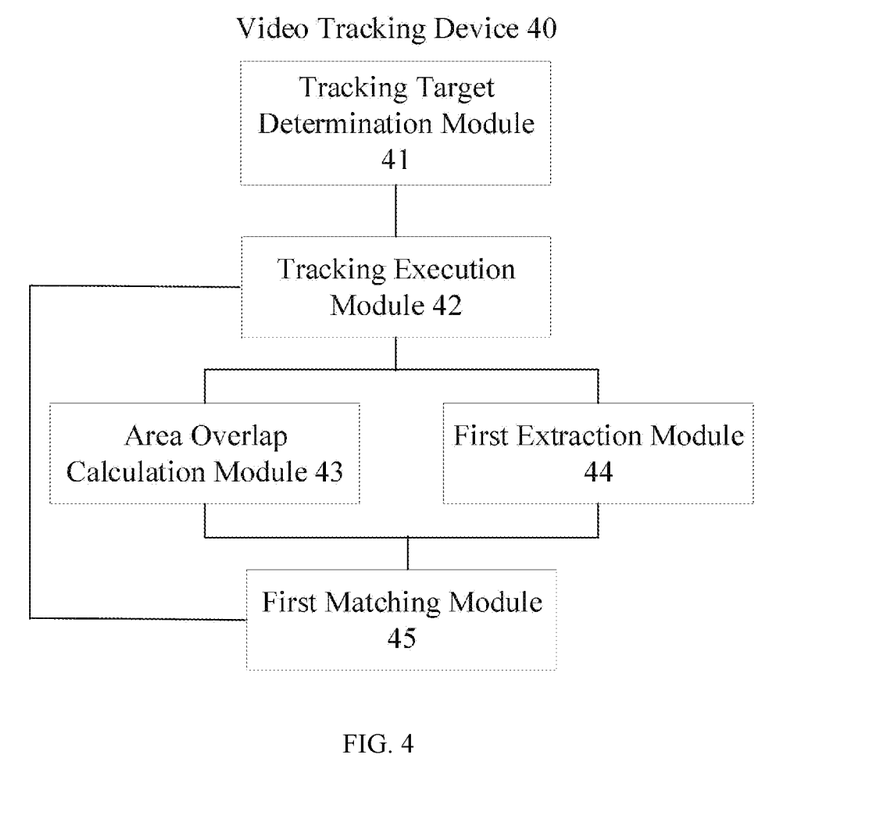
FIG. 4 is a schematic diagram illustrating a video tracking device according to an embodiment of the present invention.

FIG. 4 is a schematic diagram illustrating a video tracking device according to an embodiment of the present invention. As shown in FIG. 4, the video tracking device 40 includes a tracking target determination module 41, a tracking execution module 42, an area overlap calculation module 43, a first extraction module 44 and a first matching module 45.

The tracking target determination module 41 is configured to determine a first tracking target in the video; the tracking execution module 42 is configured to perform video tracking on the first tracking target based on the video; the area overlap degree calculation module 43 is configured to perform area overlap degree calculation on the first tracking target in a current image of the video tracking process and the first tracking target in a past image, wherein the past image is an image obtained when the first tracking target was tracked last time in the video tracking process; the first extraction module 44 is configured to extract respective feature information of feature points of the first tracking target in the video during the video tracking process on the first tracking target; the first matching module 45 is configured to match the extracted respective feature information of the feature points of the first tracking target in the current image with respective feature information of the corresponding feature points of the first tracking target in the past image if the result of the area overlap degree calculation is less than or equal to a preset threshold; and the tracking execution module 42 is further configured to continue the video tracking process on the first tracking target if the respective feature information of at least a preset number of feature points among the extracted feature points in the current image matches with the feature information of the corresponding feature points of the first tracking target in the past image.

The video tracking device 40 according to embodiments of the present invention may keep the video tracking process on the first tracking target efficiently by performing area overlap degree calculation on the first tracking target in the current image and the first tracking target in the past image of the video, and further performing matching the feature information of the feature points of the first tracking target between the current image and the past image. Thus, even if the sampling frame rate of the monitoring video is low or the area overlap degree is low due to the violent motion during the sampling process, whether the first tracking target in the current image and the first tracking target in the past image are the same tracking object may still be determined through the feature information comparison; and the video tracking process on the first tracking target is continued if the number of the matched feature points among the extracted feature points is greater than a preset number, so that a continuous video tracking on the first tracking object can be accurately carried out under some undesirable conditions such as low sampling frame rate and violent motion.

In an embodiment of the present invention, the first extraction module 44 is further configured to extract the respective feature information of the feature points of the first tracking target in the current image of the video tracking process if the result of the area overlap degree calculation of the current image of the video tracking process is less than or equal to the preset threshold. This may further reduce the computational burden of the subsequent matching process to further improve efficiency. Or, the first extraction module 44 may be further configured to extract the respective feature information of the feature points of the first tracking target in each frame image of the video tracking process in real time. In this way, the feature information extracted in real time may be used in the subsequent matching process to ensure the real-time performance and accuracy of the tracking process.

In an embodiment of the present invention, the first extraction module 44 includes a recognition program unit and an extraction program unit. The recognition program unit is configured to recognize the feature points of the first tracking target in the video, and the extraction program unit is configured to extract the respective feature information of the recognized feature points.

In an embodiment of the present invention, the video tracking device 40 may further include a judgment module, which is configured to determine the first tracking target is not a first tracking object if the number of the matched feature points among the extracted feature points in the current image is less than a preset number.

In an embodiment of the present invention, the tracking target determination module 41 may be further configured to create a second tracking target based on the extracted feature points in the current image if the number of the matched feature points among the extracted feature points in the current image is less than a preset number; wherein the tracking execution module 42 is further configured to perform video tracking on the second tracking target based on the video. Therefore, the video tracking process on the second tracking target is started, and the video tracking process on the second tracking target can be maintained by the tracking execution module 42, the first extraction module 44, the area overlap degree calculation module 43 and the first matching module 45, which are not described redundantly herein.

In an embodiment of the present invention, the tracking execution module 42 may be further configured to directly continue the video tracking process on the first tracking target if the result of the area overlap degree calculation is greater than a preset threshold. Therefore, when the result of the area overlap degree calculation is greater than the preset threshold, the first matching module 45 does not need perform the subsequent matching process based on the feature information. Instead, the video tracking process on the first tracking target may be directly continued, which improves the efficiency of the video tracking process.

In an embodiment of the present invention, the first tracking target may be a human face object, and the feature points may include one or more of the following items: a left eye feature point, a right eye feature point, a nose tip feature point, a left mouth corner feature point and a right mouth corner feature point.

In an embodiment of the present invention, the respective feature information of the feature points may include one or more of the following items: sift feature information, fast feature information and surf feature information.

Figure 5:
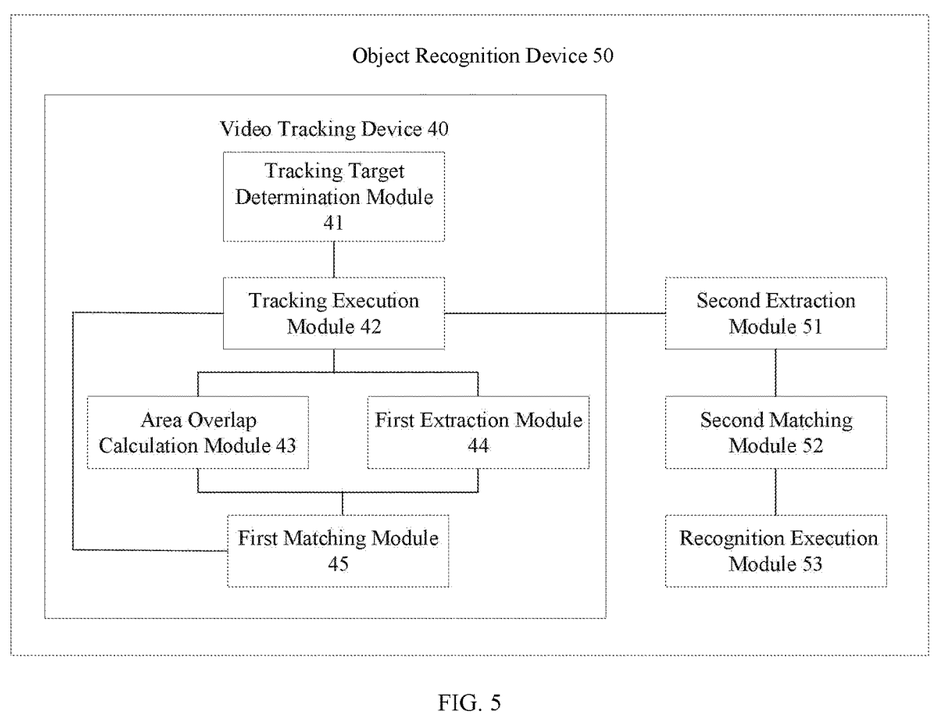
FIG. 5 is a schematic diagram illustrating an object recognition device based on video tracking according to an embodiment of the present invention.

FIG. 5 is a schematic diagram illustrating an object recognition device based on video tracking according to an embodiment of the present invention. The object recognition device 50 includes the video tracking device 40 according to any of the previous embodiments, as shown in FIG. 5, the object recognition device 50 further includes a second extraction module 51, a second matching module 52 and a recognition execution module 53.

The second extraction module 51 is configured to extract object recognition feature vectors based on at least one frame image of the video tracking process on the first tracking target; the second matching module 52 is configured to match the extracted object recognition feature vectors with object feature vectors of registered objects in a registration object library, the registration object library being established based on pre-learning of the feature vectors in the images of a plurality of registered objects; and the recognition execution module 53 is configured to take the one registered object as a recognition result if the extracted object recognition feature vectors match with the object feature vectors of one registered object.

The object recognition device 50 according to embodiments of the present invention reduce the object retrieval range in the recognition process, speed up the recognition speed, and improve the accuracy and efficiency of the recognition process by establishing the registration object library based on the object feature vectors and matching the feature vectors between the first tracking target in the image of the video tracking and the registered objects in the registration object library.

In an embodiment of the present invention, the second extraction module 51 may be further configured to extract attribute information based on the at least one frame image of the video tracking process on the first tracking target before matching the extracted object recognition feature vectors with object feature vectors of registered objects in the registration object library; the object recognition device 50 may further include a filtering module, which is configured to filter out the registered objects corresponding to the extracted attribute information in the registration object library, the registration object library being established based on pre-learning of the feature vectors and the attribute information in the images of a plurality of registered objects; wherein the second matching module 52 is further configured to match the extracted object recognition feature vectors and the respective object feature vectors of the registered objects filtered by the filtering module.

The filtered registered objects are the registered objects corresponding to the extracted attribute information. Thus, when the matching process based on the feature vectors is further performed on the filtered registered objects, the object retrieval range of the matching process based on the feature vectors may be further reduced, which may further speed up the recognition speed and improve the accuracy and efficiency of the recognition process.

In an embodiment of the present invention, the first tracking target is a human face object, and the attribute information includes one or more of gender information and age information.

Figure 6:
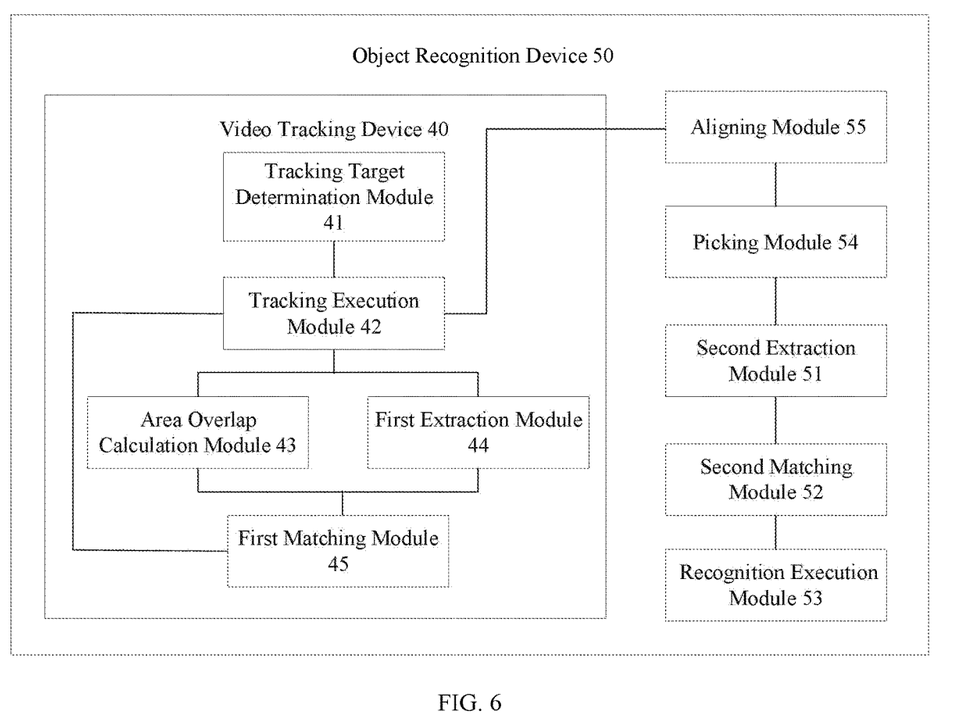
FIG. 6 is a schematic diagram illustrating an object recognition device based on video tracking according to another embodiment of the present invention.

FIG. 6 is a schematic diagram illustrating an object recognition device based on video tracking according to another embodiment of the present invention. As shown in FIG. 6, the object recognition device 50 may further include: a picking module 54, configured to pick out at least one frame image used for extracting the object recognition feature vectors from the photo stream formed by performing video tracking process on the first tracking target.

In an embodiment of the present invention, the picking condition includes one or more of the following items: a degree of blurring, a degree of exposure and object posture. The video tracking image picked by the picking module 54 can ensure the extracting quality of the object recognition feature vectors, help to improve the characterization effect of the object recognition feature vectors on the first tracking target, and improve the accuracy of the subsequent matching process.

In an embodiment of the present invention, as shown in FIG. 6, the object recognition device 50 may further include: an aligning module 55, configured to align images with a preset image template according to the position of the extracted feature points in the images after the respective feature information of the feature points of the first tracking target in the images of the video is extracted; wherein the picking module 54 is further configured to pick out at least one frame image for extracting the object recognition feature vectors from the images through the aligning process implemented by the aligning module 55. Thus, when the feature information is extracted in real time for the each frame image during the video tracking process, each frame image will go through the aligning process with the preset image template. Since the extracting position corresponding to the object recognition feature vectors to be extracted is preset on the preset image template, the object recognition feature vectors extraction process performed on the image after the aligning process can be accurate and efficient.

An embodiment of the present invention also provides a computer device, including a memory, a processor and a computer program stored in the memory and executed by the processor. When the processor executes the computer program, the steps of the video tracking method or object recognition method described in any one of the foregoing embodiments are realized.

An embodiment of the present invention further provides a computer readable storage medium which stores a computer program. When the computer program is executed by a processor, the steps of the video tracking method or object recognition method described in any one of the foregoing embodiments are realized. The computer storage medium may be any tangible medium such as a floppy disk, a CD-ROM, a DVD, a hard disk drive, or even a network medium.

It may be understood, each module or unit in the video tracking device 40 or the object recognition device 50 according to the above embodiments corresponds to one method step described above. Therefore, the operations and features described in the foregoing method steps are also applicable to the video tracking device 40, the object recognition device 50 and the corresponding modules and units included therein, and the repeated contents will not be described redundantly herein.

It may be understood, although one implementation format of the embodiments of the present invention described above may be a computer program product, the methods or devices of the embodiments of the present invention can be implemented by hardware, software or a combination thereof. The hardware part can be implemented by a specialized logic; the software part can be stored in a memory and executed by a suitable instruction execution system such as a microprocessor or dedicated design hardware. Those skilled in the art may understand that the methods and devices described above may be implemented by computer-executable instructions and/or control codes embodied in a processor, and the control code may be provided on a carrier medium such as a magnetic disk, a CD, or a DVD-ROM, a programmable memory such as a read-only memory (firmware) or a data carrier such as an optical or electronic signal carrier. The methods and devices in embodiments of the present invention may be implemented by hardware circuitry such as a ultra-large scale integrated circuit, gate array, a logic chip, a transistor, a field programmable gate array, or by software executed by various types of processors, or by a combination of the above hardware circuitry and software, for example, firmware.

It may be understood, although several modules or units of the devices have been mentioned in the above detailed description, such partitioning is merely exemplary and not mandatory. In actuality, according to the exemplary embodiments of the present invention, the features and functions of the two or more modules/units described above may be implemented in one module/unit, whereas the features and functions of one module/unit described above may be further divided into multiple modules/units. In addition, some modules/units described above may be omitted in some application scenarios.

It may be understood, in order not to obscure the embodiments of the present invention, the specification only describes some key and unnecessary technologies and features, but does not explain the features that can be implemented by those skilled in the art.

While the present disclosure has been described with reference to exemplary embodiments, it will be apparent to those skilled in the art that various changes and modifications may be made without departing from the spirit and scope of the present invention. Therefore, the above embodiments are provided for illustrative purposes only, and should not in any sense be interpreted as limiting the scope of the present disclosure.

What is claimed is:

1. A video tracking method, comprising:
   determining a first tracking target in a video, and performing a video tracking process on the first tracking target based on the video;
   performing area overlap amount calculation on the first tracking target in a current image and the first tracking target in a past image during the video tracking process, the past image being an image obtained when the first tracking target was tracked last time in the video tracking process;
   extracting respective feature information of feature points of the first tracking target in the video during the video tracking process on the first tracking target;
   if a result of the area overlap amount calculation is less than or equal to a preset threshold, matching the extracted respective feature information of the feature points of the first tracking target in the current image with the respective feature information of corresponding feature points of the first tracking target in the past image,
   if the extracted respective feature information of at least a preset number of feature points among the feature points in the current image matches with the feature information of corresponding feature points of the first tracking target in the past image, continuing the video tracking process on the first tracking target.

2. The video tracking method of claim 1, wherein extracting respective feature information of feature points of the first tracking target in the video comprises:
   extracting the respective feature information of the feature points of the first tracking target in the current image of the video if a result of the area overlap amount calculation of the current image of the video is less than or equal to the preset threshold;
   or, extracting the respective feature information of the feature points of the first tracking target in each frame image of the video in real time.

3. The video tracking method of claim 1, wherein extracting the respective feature information of the feature points of the first tracking target in the video comprises:
   recognizing the feature points of the first tracking target in the video; and
   extracting the respective feature information of the recognized feature points.

4. The video tracking method of claim 1, further comprising:
   determining the first tracking target is not a first tracking object if a number of matched feature points among the feature points in the current image is less than a preset number.

5. The video tracking method of claim 1, further comprising:
   creating a second tracking target based on the feature points in the current image, and performing video tracking on the second tracking target based on the video if a number of matched feature points among the feature points in the current image is less than a preset number.

6. The video tracking method of claim 1, after performing the area overlap amount calculation on the first tracking target in the current image and the first tracking target in the past image, further comprising:
   if the result of the area overlap amount calculation is greater than the preset threshold, continuing the video tracking process on the first tracking target.

7. The video tracking method of claim 1, wherein the first tracking target is a human face object, and the feature points comprise one or more of the following items: a left eye feature point, a right eye feature point, a nose tip feature point, a left mouth corner feature point and a right mouth corner feature point.

8. The video tracking method of claim 1, wherein the respective feature information of the feature points comprises one or more of the following items: SIFT feature information, FAST feature information and SURF feature information.

9. An object recognition method, comprising:
   determining a first tracking target in a video, and performing a video tracking process on the first tracking target based on the video;
   performing area overlap amount calculation on the first tracking target in a current image and the first tracking target in a past image during the video tracking process, the past image being an image obtained when the first tracking target was tracked last time in the video tracking process;
   extracting respective feature information of feature points of the first tracking target in the video during the video tracking process on the first tracking target;
   matching the extracted respective feature information of the feature points of the first tracking target in the current image with the respective feature information of corresponding feature points of the first tracking target in the past image if a result of the area overlap amount calculation is less than or equal to a preset threshold; and
   continuing the video tracking process on the first tracking target if the extracted respective feature information of at least a preset number of feature points among the feature points in the current image matches with the feature information of corresponding feature points of the first tracking target in the past image;
   further comprising:
   extracting object recognition feature vectors based on at least one frame image of the video on the first tracking target;
   matching the extracted object recognition feature vectors with object feature vectors of registered objects in a registration object library, the registration object library being established based on pre-learning of the object feature vectors in images of the registered objects; and
   taking one of the registered objects as a recognition result if the extracted object recognition feature vectors match with the object feature vectors of the one of the registered objects.

10. The object recognition method of claim 9, before matching the extracted object recognition feature vectors with the object feature vectors of the registered objects in the registration object library, further comprising:
    extracting attribute information based on at least one frame image of the video on the first tracking target;
    filtering out registered objects corresponding to the extracted attribute information in the registration object library, the registration object library being established based on pre-learning of the object feature vectors and attribute information in images of the registered objects;
    wherein matching the extracted object recognition feature vectors with object feature vectors of registered objects in a registration object library comprises: matching the extracted object recognition feature vectors with respective object feature vectors of the filtered registered objects.

11. The object recognition method of claim 10, wherein the first tracking target is a human face object, and the attribute information comprises one or more of gender information and age information.

12. The object recognition method of claim 9, wherein the at least one frame image used for extracting the object recognition feature vectors is picked from a photo stream formed by performing the video tracking process on the first tracking target, picking conditions comprising one or more of the following items: a degree of blurring, a degree of exposure and object posture.

13. The object recognition method of claim 12, after extracting the respective feature information of the feature points of the first tracking target in the video, further comprising:
    aligning images of the video with a preset image template based on positions of the feature points in the images of the video;
    wherein the at least one frame image used for extracting the object recognition feature vectors is picked from the images of the video which have been aligned.

14. A video tracking device, comprising:
    a processor; and
    a memory on which a computer program instruction is stored, wherein when the computer program instruction is executed by the processor, the processor performs the following steps:
    determining a first tracking target in a video, and performing a video tracking process on the first tracking target based on the video;
    performing area overlap amount calculation on the first tracking target in a current image and the first tracking target in a past image during the video tracking process, the past image being an image obtained when the first tracking target was tracked last time in the video tracking process;
    extracting respective feature information of feature points of the first tracking target in the video during the video tracking process on the first tracking target;
    if a result of the area overlap amount calculation is less than or equal to a preset threshold, matching the extracted respective feature information of the feature points of the first tracking target in the current image with the respective feature information of corresponding feature points of the first tracking target in the past image; and
    if the extracted respective feature information of at least a preset number of feature points among the feature points in the current image matches with the feature information of corresponding feature points of the first tracking target in the past image, continuing the video tracking process on the first tracking target.

15. The video tracking device of claim 14, wherein extracting the respective feature information of the feature points of the first tracking target in the video comprises:
    extracting the respective feature information of the feature points of the first tracking target in the current image of the video if a result of the area overlap amount calculation of the current image of the video is less than or equal to the preset threshold;
    or, extracting the respective feature information of the feature points of the first tracking target in each frame image of the video in real time.

16. The video tracking device of claim 14, wherein extracting the respective feature information of the feature points of the first tracking target in the video comprises:
    recognizing the feature points of the first tracking target in the video; and
    extracting the respective feature information of the recognized feature points.

17. The video tracking device of claim 14, wherein the processor further performs the following step:
    determining the first tracking target is not a first tracking object if a number of matched feature points among the feature points in the current image is less than a preset number.

18. The video tracking device of claim 14, wherein the processor further performs the following steps:
    creating a second tracking target based on the feature points in the current image, and performing video tracking on the second tracking target based on the video if a number of matched feature points among the feature points in the current image is less than a preset number.

19. The video tracking device of claim 14, after performing the area overlap amount calculation on the first tracking target in the current image and the first tracking target in the past image, the processor further performing the following step:
    if the result of the area overlap amount calculation is greater than the preset threshold, directly continuing the video tracking process on the first tracking target.

20. The video tracking device of claim 14, wherein the first tracking target is a human face object, the feature points comprise one or more of the following items: a left eye feature point, a right eye feature point, a nose tip feature point, a left mouth corner feature point and a right mouth corner feature point, and the respective feature information of the feature points comprises one or more of the following items: SIFT feature information, FAST feature information and SURF feature information.

* * * * *